Oct. 8, 1940. H. BOLAS 2,216,762
LIQUID CHILLING DEVICE
Filed Nov. 5, 1938 2 Sheets-Sheet 1
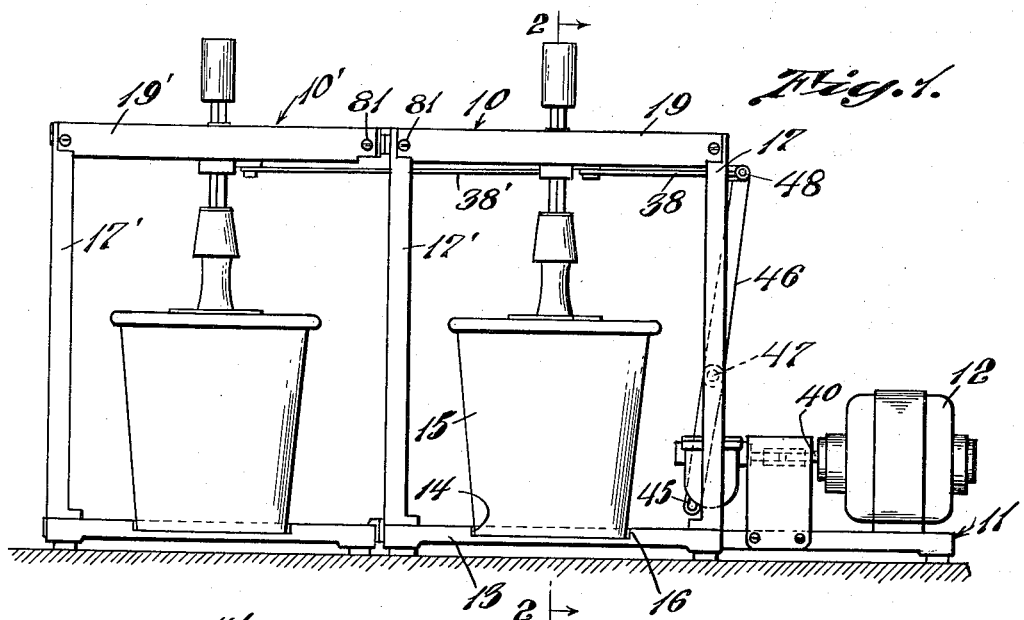
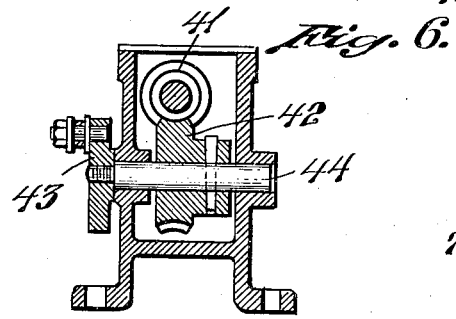
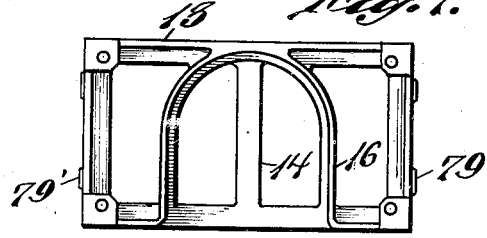
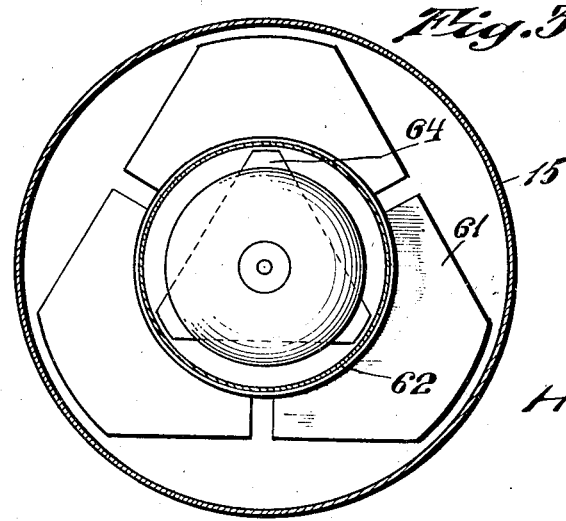
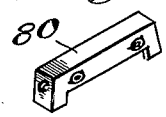
INVENTOR.
Harold Bolas
BY Barlow & Barlow
ATTORNEYS.

Oct. 8, 1940.    H. BOLAS    2,216,762
LIQUID CHILLING DEVICE
Filed Nov. 5, 1938    2 Sheets-Sheet 2
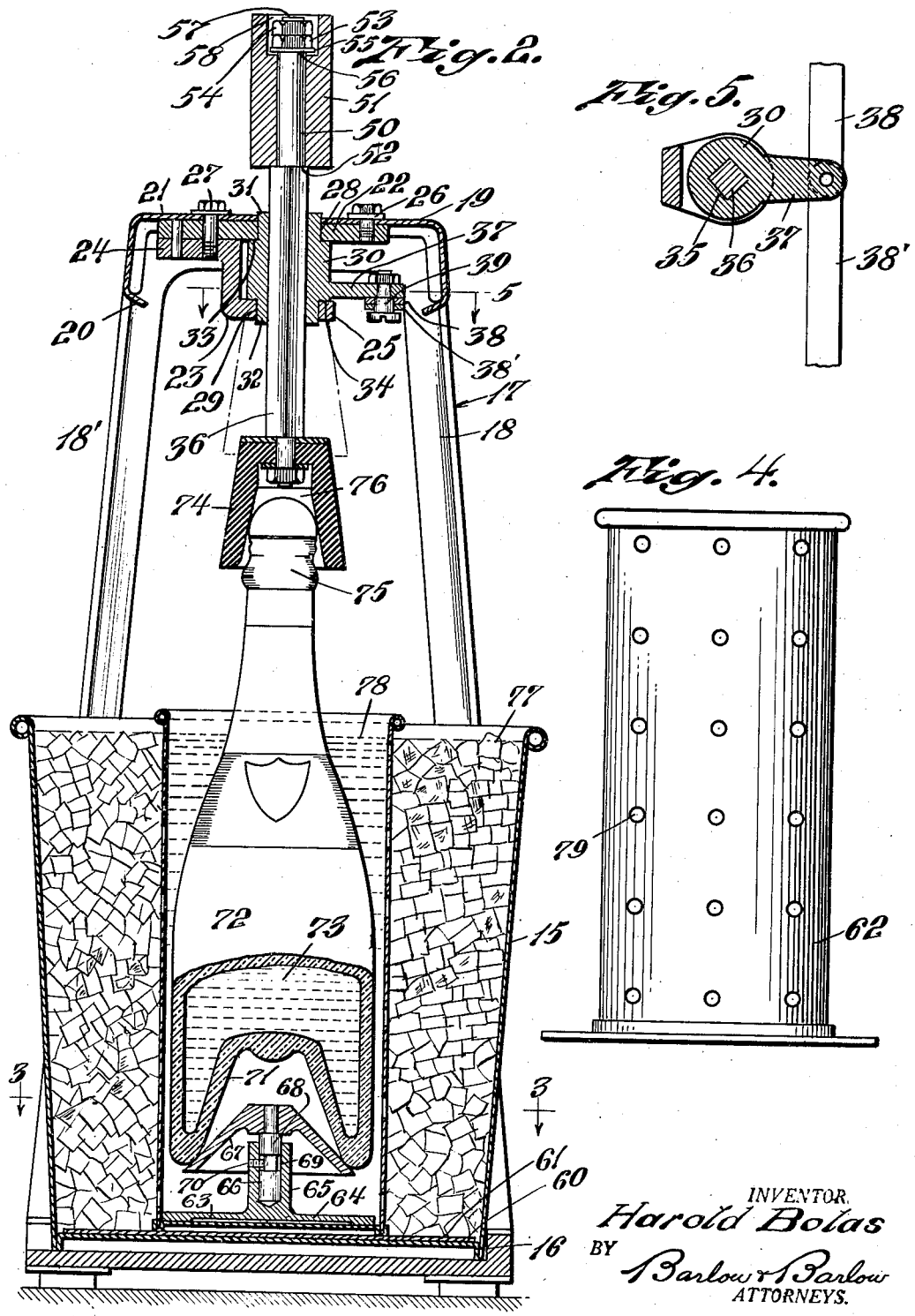
INVENTOR.
Harold Bolas
BY Barlow & Barlow
ATTORNEYS.

Patented Oct. 8, 1940

2,216,762

UNITED STATES PATENT OFFICE 2,216,762

LIQUID CHILLING DEVICE

Harold Bolas, Providence, R. I., assignor, by mesne assignments, to Providence Braid Company, a corporation of Rhode Island Application November 5, 1938, Serial No. 239,189

9 Claims. (Cl. 62—34)

This invention relates in general to the cooling of liquids. It relates in particular to means whereby wines or beverages may be quickly chilled from their cellar or stored temperature to that desirable for the purpose of their consumption.

In many hotels, country clubs, restaurants and the like, the demand for chilled wine is of a variable order, both as to time and also as to the quantity or quality required. Following upon such demand, it is clearly desirable that the order should be fulfilled with the minimum of delay, and furthermore that such wine, when served, should be at or near the proper temperature.

Champagne, for instance, should be served at a temperature of forty degrees Fahrenheit, or thereabouts. If such wine is maintained in a refrigerator for a long period at the proper temperature for consumption, it depreciates in quality. If, on the other hand, the champagne is taken from the cellar at a temperature of say 65 to 70 degrees, several hours are required in a refrigerator the internal temperature of which is 40 degrees to approximate the wine to the required condition. A further complication exists in the fact that where the number of brands which are stocked is large, the refrigeration capacity must also be large, if good service is to be maintained.

In the case of champagne, it is not uncommon to find that as many as sixteen different brands are stocked.

A method of chilling commonly in use is to place the bottle in a wine cooler or pail which is packed in ice, or with a mixture of ice and salt. In order to expedite chilling, a waiter is detailed to maintain the bottle, constantly turning or moving by hand in the ice for perhaps some twenty minutes when the wine is deemed ready to serve. The disadvantage of the method will be apparent, firstly because the waiter is detained from duties which he would otherwise perform, secondly because the resulting temperature attained is distinctly uncertain. And thirdly because the rubbing action of the ice on the bottle is liable to damage the label. Moreover, there is the additional fact that if, in order to speed up the action a considerable proportion of salt is added, the wine is likely to become frappé, the water content appearing as ice on the surface of the wine.

Another object of the invention is to provide a better form of chilling wines or other liquids, such for instance as by the use of mechanical means for accomplishing this result.

Another object is to eliminate need for attention during the chilling operation, with consequent saving in labor.

Still another object is to reduce the time required to chill to the required temperature.

A further object is to enable wines or the like to be served in the proper condition with a minimum of delay.

Yet another object is to reduce the amount of ice used in wine chilling operation.

Another object is to provide means whereby rapid chilling may be attained without the use of salt.

A further object of the invention is to provide a means consisting of a plurality of sections which may be added one to the other as desired, each section containing a single bottle whereby by the use of a single motive unit a desired number of bottles or containers may be chilled at the same time.

A still further object is to provide means whereby any bottle may be removed or inserted without interfering with the continuous chilling action of the remaining bottles.

Another object is to provide means whereby the rate of chilling is consistent at all times.

Still another object is to provide means whereby labels remain intact after the chilling operation.

With these and other objects in view, the invention consists of certain novel features of construction, as will be more fully described, and particularly pointed out in the appended claims.

In the accompanying drawings:

Fig. 1 is an elevation illustrating a plurality of units with the receptacles containing the liquid to be chilled in position for operation;

Fig. 2 is a sectional view on line 2—2 of Fig. 1;

Fig. 3 is a section on line 3—3 of Fig. 2;

Fig. 4 is an elevation of the inner coolant container;

Fig. 5 is a section on line 5—5 of Fig. 2;

Fig. 6 is a sectional view of the motor drive worm and worm gear;

Fig. 7 is a top plan view of the framework of one of the units; and

Fig. 8 is a perspective view illustrating a member utilized for attaching the units together.

According to the present invention, the receptacle containing the liquid to be chilled moves in rotary fashion in relation to the coolant and its container, such motion being procured by means of an electric motor operating through suitable gearing. The relative motion between the receptacle and the coolant may take the form of a continuous rotation, or may be of an oscillatory nature. Furthermore, the coolant container may be maintained in a stationary attitude in relation to the main framework of the machine, the receptacle being revolved or oscillated through gearing and motor, or, alternatively, the receptacle may be maintained in a static condition in relation with main framework, and motion imparted in the aforesaid manner to the coolant container.

According to one method adapted to wine chilling, a cooling vessel is provided comprising a main or outer container and an inner container arranged to be substantially concentric with one another. The inner container, preferably of cylindrical form, has a diameter which is not greatly in excess of the diameter of the largest bottle to be cooled, and is provided in its periphery with a number of holes or perforations. Such perforations are sufficiently small to prevent the passage of ice, but also being sufficiently large and numerous to allow of the free passage of liquid. The inner container is preferably of unit construction and such that it may be readily removed from the outer container for cleaning purposes. Within the inner container, and concentric with both containers, a bearing is provided upon which the lower end of the bottle to be chilled can rest and swivel freely. Above the bottle, and in alignment with the lower bearing, a driving spindle is provided, such spindle having at its lower end means to grasp and drive the upper end of the bottle; and the following is a more detailed description of the present embodiment of this invention, illustrating the preferred means by which these advantageous results may be accomplished:

The framework of the device consists of a plurality of units designated 10 and 10' which may be suitably attached together in a line of any desired length so that any desired number of receptacles containing liquid to be chilled may be operated upon at the same time with the single driving motor. Each of these units are substantially identical in construction and adapted to be added one on to another. At one end of the series there will be a framework for a motor drive designated generally 11 and comprising a mounting for a motor 12 and operating mechanism associated therewith.

Each section of the framework comprises a skeleton base 13 having a U-shaped flanged portion 14 for the reception of the outer coolant container 15 which rests upon this portion and is prevented from sliding therefrom by reason of the locating flange 16 thereof. Vertical frames 17, 17' extend upwardly from the base and each consists of angle irons 18 and 18' which converge as they proceed upwardly and are usually spaced apart a distance less than the diameter of the outer container 15 at its upper end so that the container may be readily grasped and positioned in the framework without undue interference by the framework. These frames 17 and 17' are joined together by a top, generally channel shape bar 19, in any suitable manner which channel bar has inturned lips 20 for stiffening the same and also for providing a housing for certain operating parts which may be located therein.

Centrally of the top bar of each unit there is located a bearing bracket 21 consisting of a plate 22 along the under side of the channel 19 and a Z-shaped complementary part 23 having portion 24 engaging this plate and having a portion 25 spaced therefrom. A bolt 26 holds one portion of the plate to the channel bar 19 while a bolt 27 holds another portion of the plate and also the Z-shaped part of the bracket 23 to this plate and to the channel bar 19. The plate 22 of this bracket has a bearing opening 28 and the Z-shaped portion 25 has a bearing opening 29 which support the rotary member 30 which is reduced as at 31 at one end and 32 at the other end to extend into these bearing openings 28 and 29 and be rotatably mounted. These reduced portions 31 and 32 provide shoulders, 33 and 34, which engage the plates 22 and 25 to hold the member 30 against axial movement in its bearing. This member 30 is provided with a square bore 35 for the reception of a square shaft 36 which may slide axially in the bore 35 and yet be driven by a rotary movement of the member 30 to rotate or oscillate the shaft 36. The member 30 is also provided with an arm 37 which extends radially outwardly and which is attached to a link 38 by means of bolt 39 which may also receive a second link 38' to extend to the next similar arm 37 for driving the next unit.

Motion is imparted to the link 38 by the motor 12 through the armature shaft 40 driving through a rubber coupling the reduction worm 41 and worm gear 42 which has a crank 43 on the worm gear shaft 44 to engage in the slot 45 of the lever 46 which is pivoted as at 47 and is connected as at 48 to the link 38 for oscillating the member 30 and in turn the squared shaft 36.

The upper end of this squared shaft 36 is reduced to provide a cylindrical spindle 50 which has a handle 51 rotatably mounted thereon and limited in axial movement in one direction by the shoulder 52 and limited in the other direction by nut 53 and check nut 54 holding a washer against the shoulder 56 formed between the cylindrical part 50 and the reduced threaded portion 57 of this shaft. This handle 51 is rotatably mounted upon the shaft and is recessed as at 58 to receive the nuts above spoken of which recess is sufficiently deep so as to be below the shoulder 56 and thus not be bound in position on the shaft by said units.

The bottom 60 of the outer coolant container 16 is provided with a plate 61 which plate closely approximates the size of the bottom 60 and upon which plate there is fixedly mounted the inner coolant container 62 thus generally centrally locating the inner coolant container in the outer coolant container. This inner coolant container has a bottom wall 63 which mounts a pedestal 64 having a stem 65 which has a recess 66 therein, providing a revolving bearing for the toadstool receptacle support 67 having a spindle 68 extending into the bearing in the pedestal and which spindle is recessed as at 69 and provided with a locking screw 70. This support 67 may be frustroconical in shape so as to receive the recessed end 71 of a receptacle 72 in which the liquid 73 to be cooled is contained. This frustroconical support 67 is adapted to receive various size bottles and may be of rubber or some material which will provide a good grip upon the bottle 72 when resting thereon so that the support 67 will turn in its bearing rather than the receptacle upon the frustroconical support.

The lower end of shaft 36 is provided with a resilient clutch 74 fixed thereto, usually of soft rubber and in the form of an inverted cup of a size to be placed down over the top or cap 75 of the bottle or receptacle to be cooled so as to grip this upper end of the bottle and impart a rotary motion thereto. By use of the handle 55 at its upper end, this shaft may be slid down on the bottle with sufficient force to provide the desired grip by the clutch and this may take place while the driving mechanism is in operation due to the fact that the handle is revolvably mounted upon the shaft. By reason of its conical recess 76 in the resilient clutch 74 and the conical surface at 67 supporting the bottle, the same becomes centralized, so that rotary motion may be imparted thereto.

The coolant usually comprises water and cracked ice which may or may not have salt added thereto. The ice is designated 77 and is located in the outer container while the water 78 may enter and leave the inner receptacle 62 to contact the bottle 72 and will circulate back and forth through the perforations or holes 79 in the receptacle 62. In this manner the bottle is protected from abrasion by the ice and is rotated only in the cool liquid, thus preventing scraping of the label and also providing a more even coolant action upon the liquid within the bottle.

While a rotary motion may be provided as will be readily apparent, the oscillatory motion herein illustrated is preferable as it causes the liquid to contact the outer surface of the bottle to adjust the entire temperature of the contents thereof more quickly than were a continuous rotary motion in one direction given to the same.

The units such as 10 and 10' may be attached together, with portions 79, 79' abutting, by suitable links 80, bolted as at 81 in a series dependent upon the number of bottles which it is desired that the device should have capacity for, the units being so appointed that the bar 17 is not duplicated while it is merely necessary for the driving action that link 38' from an arm 37 of one unit to the arm 39 of another be attached for the imparting of the desired driving action which is necessary for a rotary or oscillatory motion of the device.

Where ice and water are used as the coolants without the use of salt, the water in the inner container will normally be at a temperature of about 34 degrees Fahrenheit. As heat is extracted from the bottle and its contents the heated water rises and passes into the ice container through the perforations near the top of the inner container. At the same time, cold water from the ice container passes inwardly through the lower perforation, and thus a circulation of convection type is set up, tending to maintain the water in the inner container at constant temperature. A convenient and efficient speed of oscillation of the bottle is found to be about ninety complete oscillations a minute, faster rates than this not leading to substantial improvement.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A device for chilling liquids, comprising a fixed portable framework provided with a base, a coolant container mounted on said base for the reception of a receptacle holding the liquid to be cooled and fixed with reference to said framework, a revolvable bearing secured to a support loosely resting in the bottom of said container and upon which said receptacle is supported and means mounted on said framework for imparting motion to said receptacle.

2. A device for chilling liquids, comprising a fixed framework, comprising a plurality of unit sections connected together, each section having a coolant container loosely mounted on said section for the reception of a receptacle holding the liquid to be cooled and a common means for imparting relative rotary motion between each receptacle and its container of each section, including an independent clutch for the receptacle of each section whereby one receptacle may be exchanged for another while the others continue to operate.

3. In a device for chilling liquids having a coolant container for the reception of a receptacle holding the liquid to be cooled, a revolvable bearing comprising a base portion of a size to be received in said container to be positioned substantially centrally thereof and resting loosely on the bottom of said container and a conical shaped supporting part revolvably mounted on said base and upon which said receptacle is supported.

4. A device for chilling liquids comprising a framework having a base portion for receiving a coolant container for the reception of a receptacle holding the liquid to be cooled, a bearing located in said container upon which said receptacle is supported, a shaft revolvably mounted on said framework and provided with a resilient portion having a recess therein for frictionally engaging said receptacle, and means mounted on said framework for imparting relative motion to said shaft to relatively move said receptacle.

5. A device for chilling liquids comprising a framework having a base portion for receiving a coolant container for the reception of a receptacle holding the liquid to be cooled, a bearing located in said container upon which said receptacle is supported, a shaft revolvably mounted on said framework and provided with a resilient portion of a rubbery material and having a recess therein for frictionally engaging said receptacle, and means for imparting relative motion to said shaft to relatively move said receptacle.

6. A device for chilling liquids comprising a framework having a base portion for receiving a coolant container for the reception of a receptacle holding the liquid to be cooled, a bearing located in said container upon which said receptacle is supported, and means for engaging said receptacle and imparting a rotary motion thereto including a shaft revolvably mounted on said framework and having a recess at one end portion thereof provided with resilient walls for frictionally engaging said receptacle, and a handle on said shaft relatively movable therewith.

7. A device for chilling liquids comprising a framework having a base portion for receiving a coolant container for the reception of a receptacle holding the liquid to be cooled, a bearing located in said container upon which said receptacle is supported, and means for engaging said receptacle and imparting a rotary motion thereto including a support revolvably mounted on said framework and provided with a non-circular opening extending therethrough, a shaft shaped to conform to said non-circular opening and slidable therein and revolvable by said support, said shaft having a recess at one end portion thereof provided with resilient walls for frictionally engaging said receptacle, and a handle on said shaft relatively movable therewith for disengaging said recess with said receptacle while said shaft is in motion.

8. In a device for chilling liquids having a coolant container for the reception of a receptacle holding the liquid to be cooled, means for imparting a relative motion between said receptacle and container comprising a revolvable support, a shaft slidably mounted on said support and movable therewith and having a resilient clutch at one end portion thereof for frictionally engaging said receptacle, an extension on said support, a link secured to said extension and means engaging said link for imparting motion to said link and support.

9. In a device for chilling liquids having a coolant container for the reception of a receptacle holding the liquid to be cooled, means for imparting a relative motion between said receptacle and container comprising a revolvable support, a shaft slidably mounted on said support and movable therewith and having a resilient clutch at one end portion thereof for frictionally engaging said receptacle, an extension on said support, a link secured to said extension and means engaging said link for imparting motion to said link and support and a handle movably mounted at the other end portion of said shaft for disengaging said recess with said receptacle while said shaft is in motion.

HAROLD BOLAS.